Patented Sept. 4, 1945

2,384,283

UNITED STATES PATENT OFFICE 2,384,283

SYMMETRICAL DISAZO DYESTUFFS

Karl F. Conrad and Louis F. Koberlein, Buffalo, N. Y., assignors to Allied Chemical & Dye Corporation, New York, N. Y., a corporation of New York No Drawing. Application November 19, 1942, Serial No. 466,222

9 Claims. (Cl. 260—158)

This invention relates to direct disazo dyestuffs for cotton. It relates more particularly to new symmetrical disazo-N,N'-diaryl urea type dyestuffs; that is, symmetrical disazo-N,N'-diaryl derivatives of urea and thiourea.

The new azo dyestuffs of this invention comprise symmetrical disazo-N,N'-diaryl-urea type dyestuffs in which each of the aryl nuclei of the N,N'-diaryl-urea type residue:

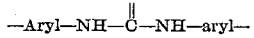

is joined to the azo group of a 2-(azo-aryl)-arylenethiazole-disulfonate radical and in which said aryl and arylene radicals are mononuclear. Thus, the dyestuffs of this invention comprise symmetrical disazo-N,N'-diphenyl ureas and disazo-N,N'-diphenyl thio-ureas in which each of the phenyl nuclei of the N,N'-diphenyl urea type residue is joined to the azo group of a 2-(azo-phenyl)-benzothiazole-disulfonate radical, and derivatives thereof in which the phenyl and/or benzo radicals contain one or more substituents in addition to the sulfo groups.

The dyestuffs of this invention are orange to dark brown powders, yielding orange to yellow aqueous solutions which dye cotton directly in yellow to orange-red to brown shades possessing exceptional fastness to light and good discharge properties. Their solutions have practically no staining effect on cellulose acetate. Despite the fact that the dyestuffs of this invention contain four solubility-enhancing sulfo groups in the molecule (from which one skilled in the art would expect the fastness to washing to be relatively unsatisfactory), it has been found that the shades produced with the dyestuffs of this invention are surprisingly fast to washing.

The dyestuffs of this invention may contain, in the benzene nuclei of the N,N'-diphenyl-urea or -thiourea radicals, and in the benzene nuclei of the 2-(azophenyl)-benzothiazole disulfonate radicals, one or more nuclear substituents in addition to the sulfonate groups of the latter radicals. Preferably the substituents are selected from the class consisting of halogen (especially, chlorine or bromine), alkyl and alkoxy groups.

The preferred dyestuffs of this invention are those which are derived from an N,N'-diaryl urea, i. e., a compound of the general formula

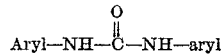

Preferably, the 2-(azo-aryl)-arylenethiazole disulfonate radicals contain a methyl group in the 6-position, e. g., the dyestuffs are advantageously derived from diazotized dehydro-thio-paratoluidine disulfonate.

The dyestuff compounds of this invention may be represented in the form of their free acids by the following general formula:

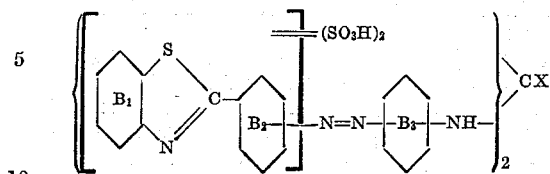

wherein X represents a member of the group consisting of oxygen and sulfur, and the benzene nuclei represented by $B_1$, $B_2$ and $B_3$ may contain substituents in addition to the indicated sulfonic acid groups.

The dyestuffs of this invention may be prepared, according to one method of procedure, by coupling a diazotized 2-(amino-aryl)-arylenethiazole-disulfonate, wherein the aryl and arylene radicals are mononuclear, with a substantially equimolecular quantity of a mononuclear aromatic primary amine (or with an N-substituted derivative thereof in which the substituent is a removable blocking group, e. g., an N-sulfomethyl derivative, if it is necessary to block the amino group during the coupling reaction, followed by elimination of the blocking group after coupling is effected); and then converting the resulting amino-monazo compound to a disazo-N,N'-diaryl urea by treating the amino-monazo compound with phosgene or other similarly reactive derivative of carbon dioxide, or to a disazo-N,N'-diaryl-thio-urea by treating the amino-monazo compound with thio-phosgene, carbon disulfide, or a similarly reactive derivative of carbon disulfide.

In certain cases the order of the said coupling and ureid-forming operations may be reversed. For example, if an N,N'-diphenyl-urea type compound having the formula:

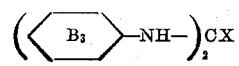

in which the symbols have the above meaning, is susceptible to coupling with a diazotized 2-(amino-aryl)-arylenethiazole disulfonate, the said N,N'-diphenyl-urea type compound may be first prepared (for instance, by phosgenation or thio-phosgenation of the corresponding mono-nuclear aromatic amine) and then coupled with two molecular equivalents of the diazotized 2-(amino-aryl)-arylenethiazole-disulfonate.

The following examples, in which parts are by weight and temperatures are in degrees centigrade, illustrate the preparation of a number of dyestuffs falling within the scope of the invention.

*Example 1.*—40 parts of dehydro-thio-para-toluidine-disulfonic acid (molecular weight=400), obtained by sulfonating 2-(4'-amino-3'-sulfophenyl)-6-methyl benzothiazole, are dissolved in about 1500 parts of water, and diazotized at 45° by addition of 7 parts of sodium nitrite and 29 parts of 20° Bé. hydrochloric acid. Sufficient sodium acetate is added to render the resulting solution neutral to Congo red, and 22 parts of aniline omega-methane-sodium sulfonate (C₆H₅NHCH₂SO₃Na)

are added in solid form. The resulting mixture is agitated at room temperature for about 16 hours to complete the coupling. Sufficient 50 per cent aqueous sodium hydroxide solution is then added to render the mixture faintly alkaline to Nitrazine Yellow paper (neutrality range: pH 6.4 to 6.8), whereupon a sufficient excess of sodium hydroxide solution is added to yield a free sodium hydroxide concentration of about 3 per cent. The resulting mixture is boiled for about two hours to eliminate the omega-sulfo-methyl group from the resulting amino-monazo compound; the mixture is neutralized with hydrochloric acid; the amino-monazo compound is salted out by addition of sodium chloride, and the resultant slurry is filtered. The product, obtained as a filter cake, is the sodium salt of 2-(4''-amino-phenyl-4'-azo-phenyl)-6-methyl-benzothiazole disulfonic acid.

The filter cake is dissolved in about 500 parts of water; 45 parts of sodium carbonate are added; and a slow current of phosgene is passed through the solution at room temperature until phosgenation is complete. The disazo-urea compound separates from the alkaline solution during phosgenation. (To test for completion of the reaction, the slurry is spotted on white filter paper and streaked with hydrochloric acid. The reaction is complete when the spot is a brown-black precipitate and a faint yellow runout is formed, yielding a brown coloration in the runout and a black coloration in the precipitate upon being streaked with hydrochloric acid.) The slurry is then filtered; the filter cake is washed with a two per cent aqueous solution of common salt and dried at about 70°.

The dyestuff thus obtained when ground is a pale yellow powder, which dissolves in water to form a yellow-orange solution. In the form of the free acid, it has the following probable formula:

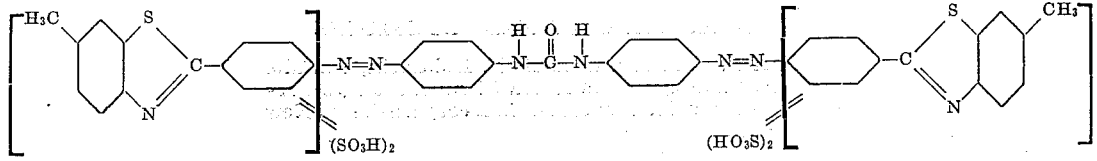

It dyes cotton directly from aqueous dye baths in yellow-orange shades which are extremely fast to light, very fast to washing, and yield good discharges. The dye baths have practically no staining effect on cellulose acetate.

Example 2.—28 parts of o-anisidine-omega-methane sodium sulfonate are substituted for the sodium salt of aniline-omega-methane sodium sulfonate employed in Example 1. The procedure is otherwise the same. The resulting dyestuff when ground is an orange powder which dissolves in water to form an orange solution. In the form of its free acid, it has the probable formula:

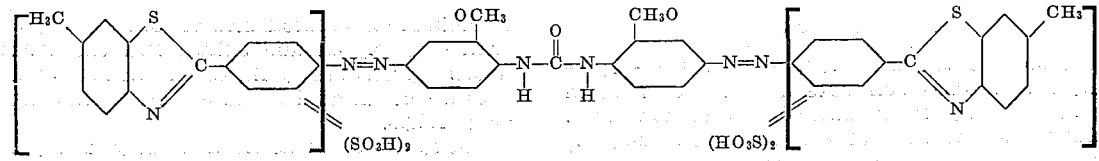

It dyes cotton directly from aqueous dye baths brownish-yellow shades which have fastness and discharge properties similar to those of the dyestuff of Example 1.

Example 3.—15 parts of cresidine (1-methoxy-2-amino-4-methyl-benzene) are substituted for the aniline omega-methane sodium sulfonate employed in the coupling procedure of Example 1. The formed amino-monazo compound is isolated, dissolved in aqueous sodium carbonate and phosgenated, and the resulting dyestuff is recovered as described in Example 1. The dyestuff, in dry, ground form, is a light brown powder which dissolves in water to form a light brown solution. In the form of its free acid, it has the following probable formula:

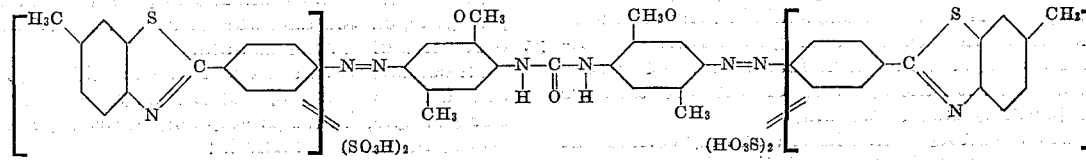

It dyes cotton directly from aqueous dye baths light brown shades which have good fastness properties and good dischargeability.

Example 4.—13 parts of para-xylidine are substituted for the cresidine employed in Example 3. The procedure is otherwise the same. The resulting dyestuff when ground is a deep orange powder, which dissolves in water to form an orange brown solution. In the form of its free acid, it has the following probable formula:

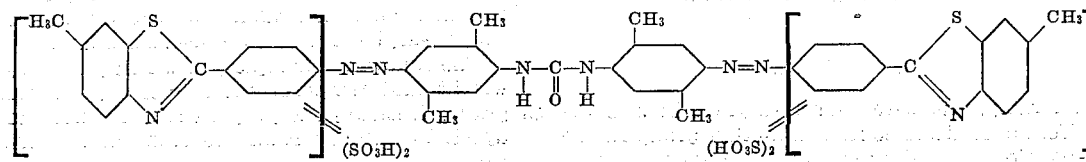

It dyes cotton directly from aqueous dye baths orange-brown shades having good dischargeability and fastness properties.

For the preparation of the corresponding thiourea dyestuffs, thio-phosgene or carbon disulfide may be substituted for the phosgene employed in the above examples and the procedures above described. Further, in the examples and procedures above described, instead of phosgene, its equivalents may be employed; such as, perchlormethyl formate or hexachlor-dimethyl-carbonate.

Other variations and modifications of the foregoing examples within the scope of the invention will be apparent to those skilled in the art. Accordingly the examples are to be interpreted in an illustrative rather than in a limiting sense.

In the appended claims, the terms "N,N'-diaryl urea type dyestuff" and "N,N'-diaryl urea type

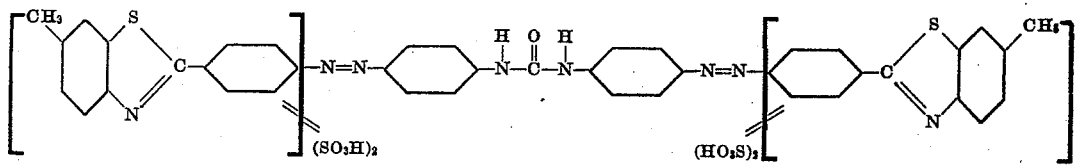

radical," respectively include, generically, N,N'-diaryl urea and -thiourea dyestuffs, and N,N'-diaryl urea and -thiourea radicals.

We claim:

1. A symmetrical disazo N,N'-diaryl urea type dyestuff having a pair of 2-(azo-aryl)-arylenethiazole-disulfonate radicals linked through their azo groups to the aryl radicals of the N,N'-diaryl urea type radical, in which the aryl and arylene radicals are mononuclear.

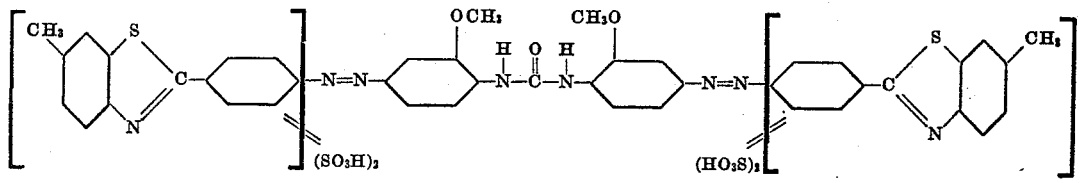

2. A symmetrical disazo N,N'-diaryl urea type dyestuff having a pair of 2-(azo-aryl)-6-methyl-arylenethiazole-disulfonate radicals linked through their azo groups to the aryl radicals of the N,N'-diaryl urea type radical, in which the aryl and arylene radicals are mononuclear.

3. A symmetrical disazo N,N'-diaryl urea type dyestuff having a pair of 2-(azo-aryl)-6-methyl-benzothiazole-disulfonate radicals linked through their azo groups to the aryl radicals of the N,N'-diaryl urea type radical, in which the aryl radicals are mononuclear.

4. A disazo dyestuff selected from the group consisting of symmetrical disazo N,N'-diphenyl urea type compounds, containing a pair of 2-(azophenyl)-benzothiazole-disulfonate radicals, linked through their azo groups to the phenyl radicals of the N,N'-diphenyl urea type radical, and their nuclearly substituted halogen, alkyl and alkoxy derivatives.

5. A symmetrical disazo diaryl urea dyestuff having a pair of 2-(azo-aryl)-arylenethiazole-disulfonate radicals linked through their azo groups to the aryl radicals of the diaryl urea radical, in which the aryl and arylene radicals are mononuclear.

6. A disazo dyestuff selected from the group consisting of symmetrical disazo diphenyl urea compounds containing a pair of 2-(azophenyl)-benzothiazole-disulfonate radicals, linked through their azo groups to the phenyl radicals of the diphenyl urea radical, and their nuclearly substituted halogen, alkyl, and alkoxy derivatives.

7. A symmetrical disazo diphenyl urea dyestuff having, in the form of its free acid, the following formula:

said dyestuff being, in the form of the sodium salt, a pale yellow solid which dissolves in water to form a yellowish-orange solution and which dyes cotton directly from aqueous dye baths in yellowish-orange shades that are fast to light and washing, substantially without staining cellulose acetate.

8. A symmetrical disazo diphenyl urea dyestuff having, in the form of its free acid, the following formula:

said dyestuff being, in the form of the sodium salt, an orange solid which dissolves in water to form an orange solution and which dyes cotton directly from aqueous dye baths in brownish-yellow shades that are fast to light and washing, substantially without staining cellulose acetate.

9. A symmetrical disazo diphenyl urea dyestuff having, in the form of its free acid, the following formula:

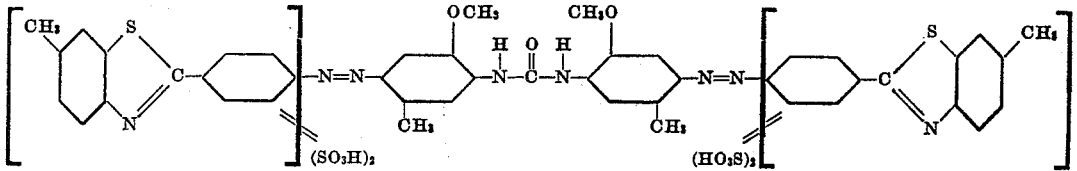

said dyestuff being, in the form of the sodium salt, a light brown solid which dissolves in water to form a light brown solution and which dyes cotton directly from aqueous dye baths in light brown shades that are fast to light and washing.

KARL F. CONRAD.
LOUIS F. KOBERLEIN.